(12) United States Patent
Breuning et al.

(10) Patent No.: US 6,467,392 B1
(45) Date of Patent: Oct. 22, 2002

(54) STEERING DAMPER FOR A HYDRAULIC POWER-ASSISTED STEERING SYSTEM

(75) Inventors: Edwin Breuning, Denkendorf; Sascha Boss, Oppenweiler; Roland Roll, Fiderstadt, all of (DE)

(73) Assignee: Mercedes Benz Lenkungen GmbH (DE)

( * ) Notice: Subject to any disclaimer, the term of this patent is extended or adjusted under 35 U.S.C. 154(b) by 15 days.

(21) Appl. No.: 09/709,067

(22) Filed: Nov. 9, 2000

(30) Foreign Application Priority Data

Nov. 9, 1999 (DE) .......................... 199 53 941

(51) Int. Cl.⁷ ...................... F15B 11/042; F15B 11/044
(52) U.S. Cl. ................... 91/447; 60/469; 137/493.9
(58) Field of Search ................ 60/469; 91/31, 91/375 R, 447, 452; 137/493.8, 493.9, 513.5, 513.7

(56) References Cited

U.S. PATENT DOCUMENTS 6,164,320 A * 12/2000 Hamano et al. ......... 137/493.8

FOREIGN PATENT DOCUMENTS

| DE | 4029156 A | * | 4/1991 |
| DE | 4423658 A1 | | 1/1996 |

* cited by examiner

Primary Examiner—Edward K. Look
Assistant Examiner—Thomas E. Lazo
(74) Attorney, Agent, or Firm—Woodbridge & Associates, P.C.; Richard C. Woodridge

(57) ABSTRACT

The invention concerns a hydraulic power-assisted steering system for motor vehicles, with a valve and two hydraulic lines leading from the valve to cylinders of a servo drive mechanism and with at least one steering damper, the steering damper having a basic body 4 which is arranged movably along a path in a working chamber 3 and delimits with an outer wall 2 of the working chamber 3 a first channel through which hydraulic fluid can flow.

5 Claims, 2 Drawing Sheets

STEERING DAMPER FOR A HYDRAULIC POWER-ASSISTED STEERING SYSTEM

BACKGROUND OF THE INVENTION

1. Field of the Invention

In view of these considerations it is the objective of the present invention to provide a power-assisted steering system with a steering damper in which the steering damper has a simpler configuration with regard to the constructional elements used and is less complicated to assemble.

2. Discussion of Related Art

This objective is met by a power-assisted steering system with the with the features described in the detaileed description of the invention. The large N sealing area entailed by this arrangement requires a 100% quality test at the end of the manufacturing process.

SUMMARY OF INVENTION

Because the one or more steering dampers are arranged in the hydraulic line, the sealing of the hydraulic damper in the assembled position is reduced ultimately to the sealing of a simple line. Fluid-tightness at this point is very easy to achieve. The steering damper itself can be simply constructed using this arrangement.

If, in addition, the hydraulic line is made of a metal and the steering damper is arranged in an expanded section of the hydraulic line, the fixing of the steering damper in the line is especially simple. In particular, it can also be located floatingly in this position. Assembly can further be made especially simple by making the expanded portion of the hydraulic line separable, for example, in the manner of a plug connector, the expanded portion being opened for assembly of the steering damper and closed pressure-tight after assembly. For this purpose bonding or screw fixing can be provided, as can a clamped joint.

If the steering damper has a basic body which is arranged movably along a path in a working chamber and delimits with an outer wall of the working chamber a first channel through which hydraulic fluid can flow, the steering damper with its housing can be located in the working chamber without the housing itself forming a sealed face to the outside. If at one end of the travel of the basic body oriented away from the associated cylinder, the basic body so abuts against a valve seat that the first channel is closed in the return flow direction oriented away from the cylinder, and in particular if the basic body of the steering damper forms the valve element of a non-return valve, the diversity of parts can be further reduced.

In this case the basic body is preferably preloaded by a spring in the position which closes the channel. and opens the first channel when fluid flows in the main flow direction oriented towards the cylinder of the power-assisted steering system. Inside the housing a second inner channel can be provided, which is closable by a spring-loaded valve element, this valve element opening when subjected to pressure in the return flow direction and closing in the main flow direction. In this way the characteristics of a damping valve are realised in a simple fashion inside the basic body.

The effect of the steering damper can be made temperature-dependent if the spring of the valve element is made of a shape memory material. In addition, the basic body can have a number of flat faces on its outer surface, which faces form the first channel with a relatively large cross section in an especially simple way.

An especially simple arrangement of the steering damper results if a steering damper is mounted floatingly in each hydraulic line. In this case the working chamber of the steering damper can be arranged in the end portion of the hydraulic line.

In a different embodiment, in which the fluid flow is controlled by a throttle element, the steering damper has a tubular damper housing which has a guide element arranged in the housing, a throttle element displaceable in the main flow direction or in the return flow direction being mounted on the guide element. The throttle element can be preloaded by a spring in the return flow direction. The housing preferably has a stepped internal bore with one larger internal diameter and at least one smaller internal diameter, the throttle element being forced against the spring pressure into the zone of larger internal diameter during operation when fluid flows in the main flow direction, thus delimiting a larger free cross section with the bore, whereas it delimits a smaller free cross section when fluid flows in the return flow direction. Finally, the guide element in this embodiment can be located preferably coaxially in the bore by a fixing section which has recesses or flat portions. In this way it is ensured firstly that the guide element is arranged in a favourable position with regard to flow and secondly it does not constrict the necessary free cross section.

In the following description one example of the present invention is described with reference to the drawings.

BRIEF DESCRIPTION OF THE DRAWINGS

FIG. 1 shows the steering damper of a power-assisted steering system according to the invention in a cross section from the side. A tubular, metallic hydraulic line 1 is expanded from inside in a section 2 and forms a cylindrical working chamber 3 in this section. A basic body 4 of the steering damper is located floatingly in the working chamber 3. The basic body 4 is forced by a helical spring 5 against the end of working chamber 3 opposite to spring 5.

DETAILED DESCRIPTION OF THE INVENTION

Figure 1:
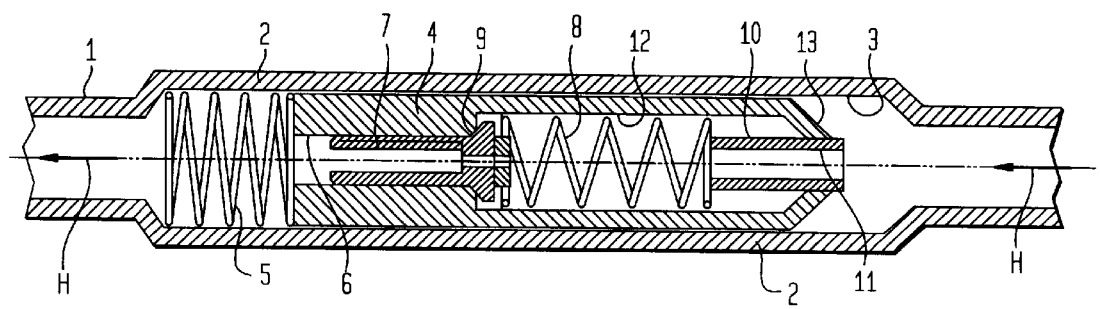
FIG. 1 shows a steering damper according to the invention in a working chamber formed by expanding the hydraulic line, the damping function being inactive.

The basic body 4 has flat faces, not shown in the drawing, on its outer surface, while a concentric bore 6 is provided in it for a valve body 7 located inside the basic body 4. The valve body 7 is urged by a second helical spring 8 against a valve seat 9 surrounding the bore 6 inside the basic body 4. The end of spring 8 facing away from the valve body 7 rests against a pin 10, which also has a concentric bore 11. Bore 11 is open towards a chamber 12 inside basic body 4.

Finally, basic body 4 has a chamfered portion 13 formed as a truncated cone on its end facing away from spring 5.

Figure 2:
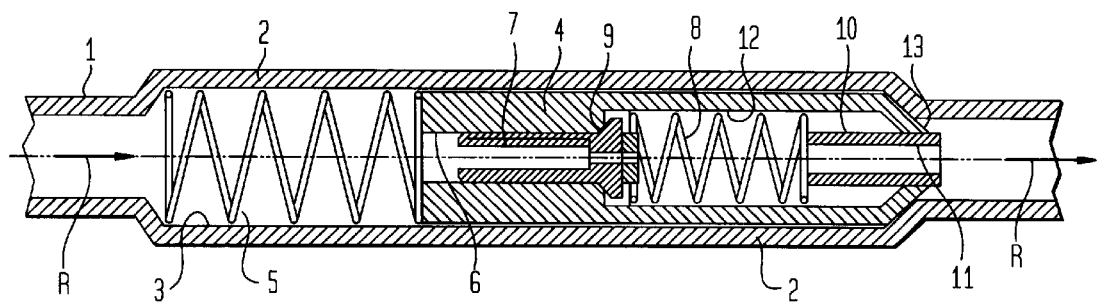
FIG. 2 shows the steering damper according to FIG. 1 with the damping function active.

In FIG. 1 the steering damper is shown with the basic body 4 being forced towards the left against the force of spring 5. In FIG. 2 the second working position of the steering damper according to FIG. 1 is illustrated, with spring 5 forcing the basic body 4 towards the right and the valve element 7 also being displaced from its rest position to the right against the force of spring 8.

In practice the steering damper according to FIGS. 1 and 2 is arranged in the hydraulic lines of a hydraulic power-assisted steering system which lead from the servo valve to the individual cylinders of the hydraulic servo drive mechanism. In this case a main flow direction of the hydraulic fluid is defined as that which leads into the associated cylinder of the hydraulic servomotor, while a return flow direction leads out of the cylinder in which the pressure has been released.

The main flow direction is indicated in FIG. 1 and FIG. 2 [sic] by the arrow H from right to left, while the return flow direction is oriented towards the right in FIG. 2 and is indicated by the arrows R.

As conventional motor vehicle power-assisted steering systems have a servomotor with a total of two cylinders, two hydraulic lines from the servo valve to the hydraulic servomotor are provided. Two steering dampers, constructionally identical as far as possible, are used in all.

In practice the steering damper of the power-assisted steering system according to the invention operates in such a way that when the servo valve is actuated a hydraulic flow is conducted in the main flow direction according to FIG. 1 into the cylinder which is provided to contribute the auxiliary steering power. The main flow enters the working chamber 3 from right to left and forces the basic body 4 to the left (downstream) against the returning force of spring 5. As this happens the hydraulic fluid will flow past the flat faces of basic body 4. The valve body 7 inside the basic body is forced against the valve seat 9 both by the pressure of the hydraulic fluid flowing through the bore 10 into the chamber 12, and by the force of spring 8, and closes bore 6 in basic body 4. If the flow direction in the hydraulic line is reversed, so that the hydraulic fluid flows in the return flow direction R as shown in FIG. 2, the basic body 4 of the steering damper is forced to the right both by spring 5 and by the pressure of the hydraulic fluid, the front face 13 coming to rest against the parallel-oriented end portion of working chamber 3 and closing the space made available to the main flow direction by the flat faces of basic body 4. The hydraulic fluid now flows into bore 6 of basic body 4 and displaces valve element 7 against the force of spring 8, causing valve seat 9 to be exposed. The hydraulic fluid flows past valve seat 9 into the inner chamber 12 and through bore 11 and further in return flow direction R into the hydraulic line (back to the servo valve).

In this respect the basic body 4 of the steering damper performs the function of a non-return valve, while the valve element 7, together with spring 8, takes over the function of a damping or throttling valve.

Bore 6, valve seat 9, inner chamber 12 and bore 11 thus form a second channel for the return flow direction. The cross section of the second channel is smaller than that of the first channel, resulting in a damping effect in the return flow direction.

This damping effect is especially desirable when external forces act on the steered wheels, e.g. when parking, if the motor vehicle rolls against a kerb. The sudden reaction on the steering wheel is damped by the steering damper in its position illustrated in FIG. 2.

In a power-assisted steering system according to the invention spring 8 can be made of a shape memory material, so that below a certain temperature its overall length is reduced and the spring effect weakens. The damping function is thereby switched off at low temperatures. At these temperatures the higher viscosity of the hydraulic fluid is sufficient on its own to provide damping. As soon as the transition temperature of spring 8 is reached it extends to its planned length and forces valve element 7 against valve seat 9. As a lower viscosity of the hydraulic fluid is reached the damping function then becomes active again in the desired manner.

Figure 3:
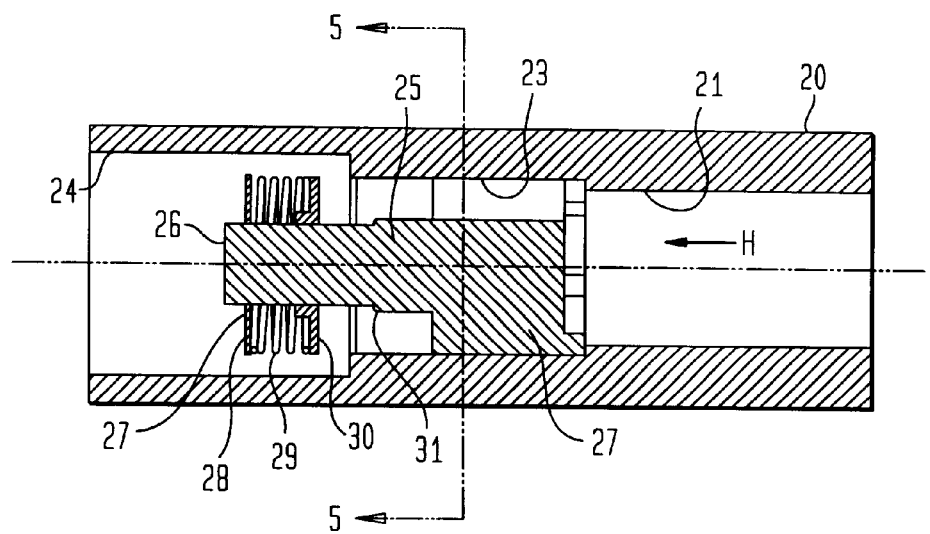
FIG. 3 shows a second embodiment of the steering damper according to the invention with a disc-shaped throttle element, illustrated with fluid flowing in the main flow direction.

FIG. 3 shows another embodiment of a power-assisted steering system according to the invention in a cross section from the side. A tubular damper housing 20, illustrated in a similar way to that in FIGS. 1 and 2, is provided for use in a tubular hydraulic line which is not illustrated here. The damper housing 20 has a stepped internal bore passage which has a section of small diameter 21, a section of medium diameter 23 and a section of larger diameter 24. In section 23 a coaxial pin 25 with a rod-shaped guide element 26 is inserted, the pin 25 being given an approximately stellar configuration by ribs 27, in order to form sufficiently large flow channels in the axial direction. The guide element 26 carries a coaxial securing ring 28, arranged in a fixed manner on the guide element 26. It is followed in the direction towards ribs 27 by a helical spring 29 and an annular throttle element 30 which is urged by the spring 29 into the section with medium diameter 23.

FIG. 3 shows the above-described device with fluid flowing in the main flow direction H, that is, to the left in the drawing. The throttle element 30 is forced to the left against the force of spring 29, which rests against securing element 28.

Figure 4:
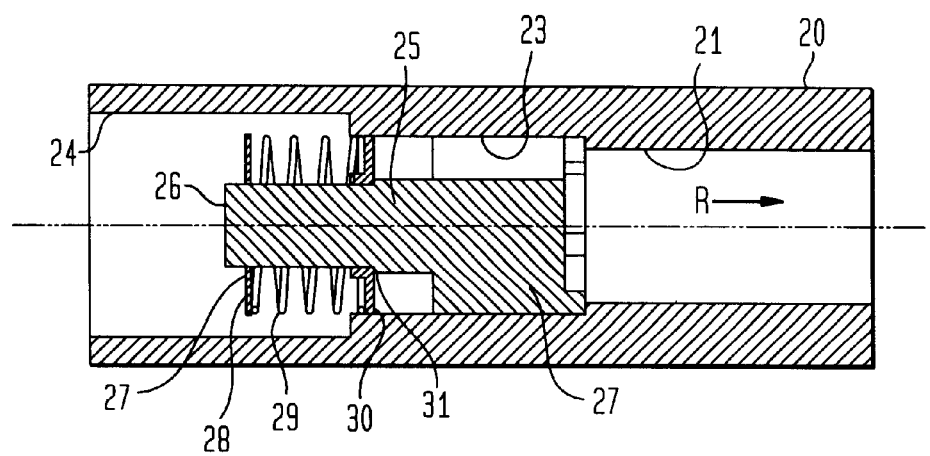
FIG. 4 shows the steering damper according to FIG. 3 in the return flow direction.

FIG. 4 shows the above-described device with fluid flowing in the return flow direction R, that is, to the right in the drawing. Here the throttle element 30 rests against an annular collar 31 on the guide element 26 and is illustrated in its working position furthest to the right.

Figure 5:
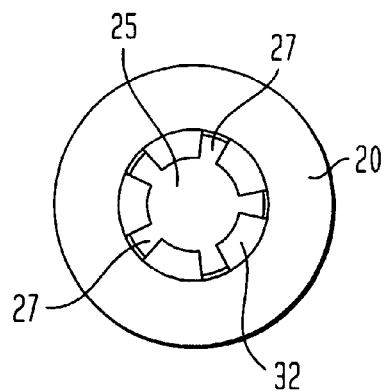
FIG. 5 shows a cross section through the steering damper according to FIG. 3 along the line V—V.

Finally, FIG. 5 shows a cross section through the steering damper according to FIG. 3 along the line V—V. It can be seen that the ribs 27 of the fixing element 25 provide a total of five flow channels aligned in the axial direction. In operation, when fluid flows in the main flow direction H, throttle element 30 is forced in the direction illustrated in FIG. 3, a large free cross section, which resists the flow of fluid hardly or not at all, being formed with the larger-diameter section 24. In the opposite direction, illustrated in FIG. 4, the throttle element 30 delimits with the bore section 23 a very small free cross section, having an area in the order of one or a few square millimeters. This small cross section effects the damping of the fluid flow in the return flow direction R.

In preferred embodiments the damping element 30 can be an annular plate of spring metal which deforms at high pressure peaks, thus reducing these pressure peaks. In addition, helical spring 29 can be made of a shape memory metal which makes possible temperature-dependent switching on and off the steering damper.

The steering damper described hereinbefore can be used, for example, in an internally expanded section 2 of hydraulic line 1, the line being made narrower again at its end after insertion, so that the steering damper is so arranged in line 1 that it cannot be lost.

However, the steering damper can also be arranged in a corresponding bore provided in the housing of the steering servo mechanism itself, or of the servo valve. In every case an advantage results from the fact that only a small number of parts is required to manufacture the steering damper.

Furthermore, series-produced connecting elements available for the hydraulic lines can be used. The large-diameter hollow threaded sections are no longer required.

What is claimed is:

1. A power assisted steering system comprising:

hydraulic lines leading from a valve to cylinders of a servo drive mechanism with a first flow direction designated (H) and a second flow direction designated (R); with at least one hydraulic line made of metal; with at least one of said hydraulic lines having an expanded portion; said expanded portion of said hydraulic line being separable and openable allowing assembly of a steering damper and said expanded portion of said hydraulic line being closable in a pressure-tight manner; and, at least one steering damper arranged in said expanded portion of one of said hydraulic lines.

2. A power assisted steering system comprising:

hydraulic lines leading from a valve to cylinders of a servo drive mechanism with a first flow direction designated (H) and a second flow direction designated (R); at least one steering damper arranged in one of said hydraulic lines; said steering damper comprising:
- a tubular damper housing (20);
- a guide element (26) arranged inside said tubular damper housing (20); and,
- a throttle element (30) mounted on said guide element (26) which is displaceable in the direction of said first direction of flow (H) or said second direction of flow (R).

3. A power assisted steering system comprising:

a tubular damper housing;

hydraulic lines leading from a valve to cylinders of a servo drive mechanism with a first flow direction designated (H) and a second flow direction designated (R);

at least one steering damper arranged in one of said hydraulic lines; said tubular damper housing comprising:
- a stepped internal bore (21) with one larger internal diameter (24) and at least one smaller internal diameter (23);
- a throttle element (30);
- a spring (29);
- wherein said throttle element is forced into said larger internal diameter (24) against the force of said spring (29) when said fluid flows in said first direction (H), thereby defining a larger free cross section for flow and said throttle element (30) is forced out of said larger internal diameter (24) with the force of said spring (29) when said fluid flows in said second direction (R) thereby defining a small free cross section for flow when said steering system is in operation.

4. A power assisted steering system comprising:

hydraulic lines leading -from a valve to cylinders of a servo drive mechanism with a first flow direction designated (H) and a second flow direction designated (R); with at least one hydraulic line made of metal; with at least one of said hydraulic lines having an expanded portion; said expanded portion of said hydraulic line being separable and openable allowing assembly of a steering damper and said expanded portion of said hydraulic line being closable in a pressure-tight manner;

at least one steering damper arranged in said expanded portion of one of said hydraulic line being closable in a pressure-tight manner; and, at least one steering damper arranged in said expanded portion of one of said hydraulic lines said steering damper comprising:
- a tubular damper housing (20) comprising;
  - stepped internal bore (21) with one larger internal diameter (24) and at least one smaller internal diameter (23);
  - a throttle element (30);
  - a spring (29);
  - wherein said throttle element (30) is forced into said larger internal diameter (24) against the force of said spring (29) when said fluid flows in said first direction (H), thereby defining a large free cross section for flow and said throttle element (30) is forced out of said larger internal diameter (24) with the force of said spring (29) when said fluid flows in said second direction (R) thereby defining a small free cross section for flow when said steering system is in operation and said throttle element (30) deforms elastically, thereby enlarging the free cross section for flow when fluid flows at high velocity in said second direction (R);
- a guide element (26) arranged inside said tubular damper housing (20); and,
- a throttle element (30) mounted on said guide element (26) which is displaceable in the direction of said first direction of flow (H) or said second direction of flow (R).

5. A power assisted steering system comprising:

hydraulic lines leading from a valve to cylinders of a servo drive mechanism with a first flow direction designated (H) and a second flow direction designated (R); with at least one hydraulic line made of metal; with at least one of said hydraulic lines having an expanded portion; said expanded portion of said hydraulic line being separable and openable allowing assembly of a steering damper and said expanded portion of said hydraulic line being closable in a pressure-tight manner;

at least one steering damper arranged in said expanded portion of one of said hydraulic line being closable in a pressure-tight manner; and, at least one steering damper arranged in said expanded portion of one of said hydraulic lines said steering damper comprising:
- a tubular damper housing (20);
- a guide element (26) arranged inside said tubular damper housing (20) comprising;
  - a fixing section (31) which has recesses (32);
- a throttle element (30) mounted on said guide element (26) which is displaceable in the direction of said first direction of flow (H) or said second direction of flow (R).

* * * * *